United States Patent [19]

Rutledge

[11] 4,121,322
[45] Oct. 24, 1978

[54] CRUSTACEAN MEAT EXTRACTION MEANS

[76] Inventor: James E. Rutledge, 13543 Honey Dr., Baton Rouge, La. 70808

[21] Appl. No.: 845,343

[22] Filed: Oct. 25, 1977

[51] Int. Cl.² .......................................... A22C 29/00
[52] U.S. Cl. ........................................ 17/73; 17/48
[58] Field of Search ............................. 17/73, 48, 71

[56] References Cited

U.S. PATENT DOCUMENTS

| 2,987,759 | 6/1961 | Lapeyre et al. | 17/73 |
| 3,084,379 | 4/1963 | Henning | 17/73 X |

FOREIGN PATENT DOCUMENTS

| 35-5,022 | 1960 | Japan | 17/73 |

Primary Examiner—Frank T. Yost
Attorney, Agent, or Firm—Roy, Kiesel, Patterson & Abadie

[57] ABSTRACT

An apparatus for extracting the edible meat from crayfish, shrimp, crabs and other like crustaceans is provided comprising a pair of rollers positioned adjacent to one another to form a nip for receiving the crustacean wherein the lower nip is provided with at least one groove for receiving the meat as it is squeezed from the crustacean shell.

9 Claims, 4 Drawing Figures

CRUSTACEAN MEAT EXTRACTION MEANS

BACKGROUND OF THE INVENTION

1. Field of the Invention

This invention relates in general to butchering and more particularly to crustacean meat extraction means and processes therefor.

2. Prior Art

Efficient and effective methods for extraction of crustacean meat from the shells of crustaceans have long been sought by the seafood industry. For example in the crab industry exploding methods such as disclosed in U.S. Pat. No. 2978334 entitled "Process For Extracting Meats From Crustaceans" issued Apr. 4, 1961 to James Martial Lapeyre and U.S. Pat. 3812271 entitled "Method For Extracting Meats From Crustaceans" issued May 21, 1974 to James M. Lapeyre have been utilized.

The use of chemicals has also been employed to assist in the extraction of meat crustaceans, particularly shrimp, as illustrated in U.S. Pat. No. 3705040 entitled "Process of Extracting Meat From Crustaceans Particularly Shrimp" issued Dec. 5, 1972.

Various other techniques such as use of centrifuging such as disclosed in U.S. Pat. No. 3548449 entitled "Crabmeat Extraction Method" issued Dec. 22, 1970 to W. L. Lockerby, U.S. Pat. No. 3555595 entitled "Crab Meat Separating Apparatus" issued January 19, 1971, to C. B. Tolley and U.S. Pat. No. 3229325 entitled "Apparatus for Extracting Crab Meat" issued Jan. 18, 1966, to Ernst J. Amelang. Of particular interest to this invention are U.S. Pat. 2660754 entitled "Crayfish Picking Machine" issued Dec. 1, 1973 to F. D. Roshko, U.S. Pat. No. 3251091 entitled "Recovery of Crab Meat" issued May 17, 1966 to F. M. Altman, U.S. Pat. 3201822 entitled "Removal of Meat From Separated Sections of the Legs of King Crab" issued Aug. 24, 1965 to E. W. Glidden, et al and U.S. Pat. No. 3203039 entitled "Removal of Meat from Separated Sections of the Legs of King Crab" issued Aug. 31, 1965 to E. W. Glidden, et al, all of which disclose the use of rollers to extract the meat from the crustacean shell. A good summary of the recent patent art in the various extraction processes may be found in a book entitled "Fish and Shellfish Processing" by M. T. Gillies and published by Noyes Data Corporation, Noyes Building, Park Ridge, N.J.

Particular difficulties encountered with the various prior art methods, including the roller apparatus use, include shredding or tearing of the meat, incomplete removal of the meat from the crustacean shell, clogging of the extraction equipment causing shut downs and production delays and limitations as to the types of crustacean which can be processed with the extraction equipment.

SUMMARY OF THE INVENTION

Therefore, it is an object of this invention to provide apparatus and processes for extraction of meat from crustacean shells which reduces or eliminates the tearing or shredding of the meat.

Another object of this invention is to provide apparatus and processes for more effective and efficient methods for extraction of meat from crustacean shells.

Still another object of this invention is to provide an apparatus that prevents sticking of the extracted meat on the apparatus rollers for more than one revolution on the rollers.

These and other advantages and objects of the invention will become apparent from the ensuing descriptions of the invention.

Accordingly, an apparatus for extraction of meat from a crustacean shell, such as crab, crayfish, etc., is provided comprising a first and second roller positioned adjacent one another to form a nip for receiving the crustaceans, a drive means attached to one of the rollers in order to rotate the rollers in opposite directions, wherein one of the rollers is provided with at least one groove of sufficient size to hold any meat extracted from the crustacean shell when it passes through the nip.

PREFERRED EMBODIMENTS OF THE INVENTION

Figure 1:
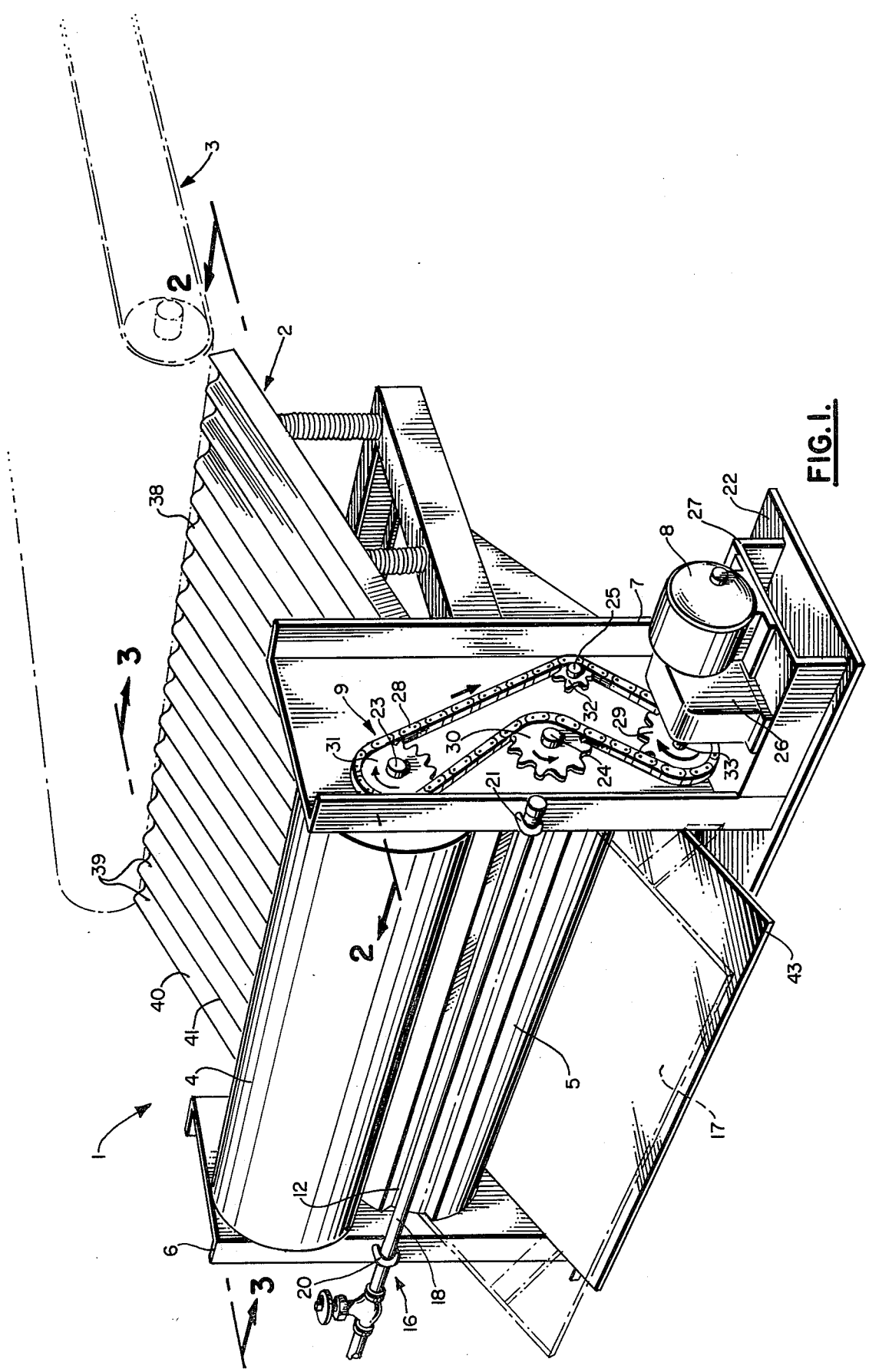
FIG. 1 is a perspective view of one embodiment of the invention designed specifically for the handling of crayfish.
Figure 2:
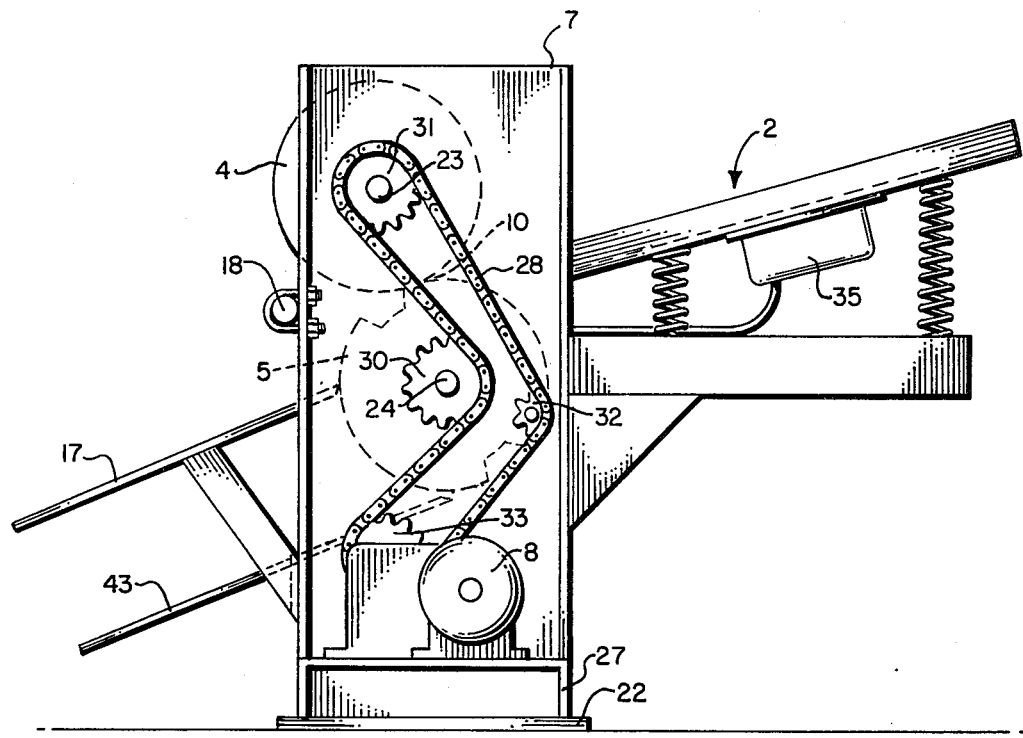
FIG. 2 is a cross-sectional view taken along lines 2—2 of FIG. 1.

Referring to FIG. 1, the crustacean meat extraction device, denoted generally by the numeral 1, is shown in conjunction with a conventional vibrator 2 and conveyor 3 for feeding the crustaceans (e.g., crayfish) into device 1, wherein extraction device 1 comprises preferably top roller 4 and bottom roller 5, both rotatably mounted to side support plates 6, 7 and connected to motor 8 by sprocket-and-chain assembly 9.

Rollers 4 and 5 are positioned adjacent one another to form a nip 10 to receive the crustaceans. Preferably, bottom roller 5 will be positioned ahead of top roller 4 to facilitate the positioning of the crustacean as it enters nip 10.

Bottom roller 5 is provided with grooves 11 and 12 located on the roller's outer surface 13 and are designed to be of sufficient size to hold the crustacean meat 14 as it is squeezed out of the crustacean shell 15 when the shell passes through nip 10. Preferably, grooves 11 and 12 will extend completely between the ends of bottom roller 5 in order that more than one crustacean can be processed at a time. The depth of grooves 11 and 12 is preferably sufficient so that as groove 11 or 12 pass beneath top roller 4, the crustacean mean 14 in the groove does not contact roller 4.

In another preferred embodiment, a washing assembly 16 attached to side support pieces 6, 7 by brackets 20, 21, respectively, is provided to dampen the rollers to reduce sticking of shells 15 on the rollers, as well as, to help wash the shells off the rollers and onto shell receiving tray 17. Washing assembly 16 comprises a pipe 18 attached to a water source (not shown). Pipe 18 is provided with multiple openings 19 directed toward the rollers. In still another preferred feature, shell receiving tray 17 has edge 18 positioned adjacent roller surface 13 to facilitate the removal of shells 15 from the roller surface.

In another preferred embodiment, a meat receiving tray 19 is positioned below roller 5 to receive meat pieces 14 as they drop out of grooves 11 and 12.

Side support plates 6, 7 are perpendicularly attached to floor plate 22 and are provided with openings to receive roller axles 23 and 24, as well as, sprocket axle 25. Motor 8 and gear reduction box 26 are secured to stand 27 attached to floor plate 22. Chain 28 is positioned about sprockets 29, 30, 31 and 32 as shown so that as gear reduction box axle 33 is rotated by motor 8, rollers 4 and 5 are rotated in opposite directions.

Figure 3:
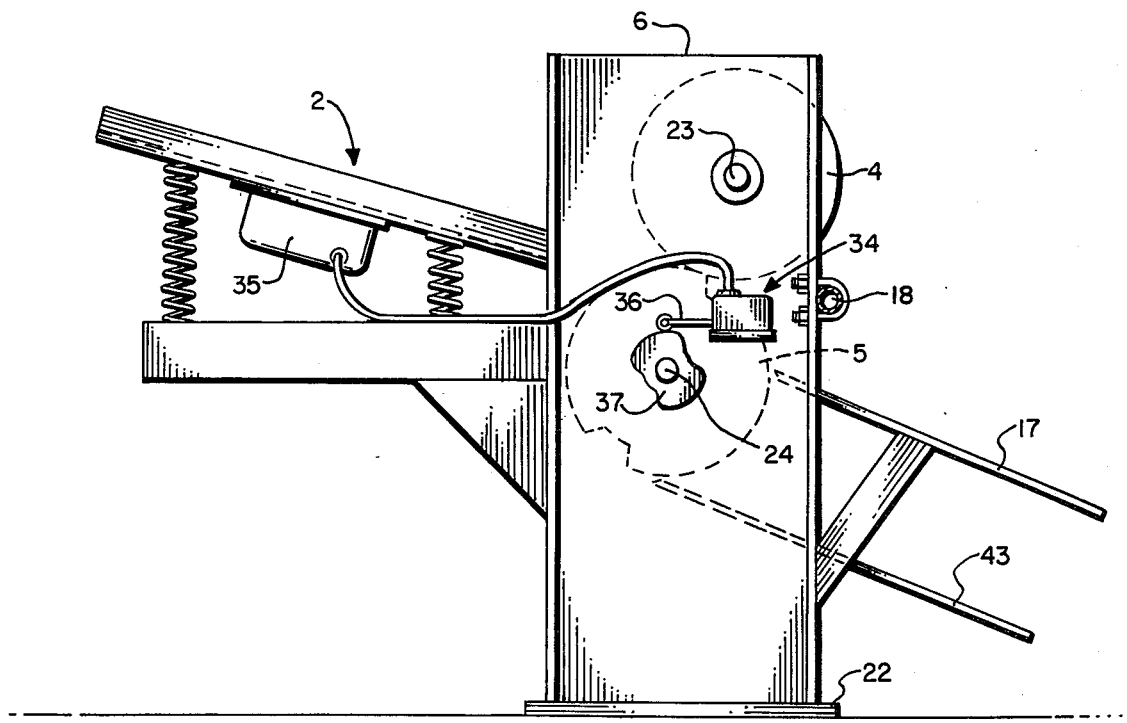
FIG. 3 is a cross-sectional view taken along lines 3—3 of FIG. 1.
Figure 4:
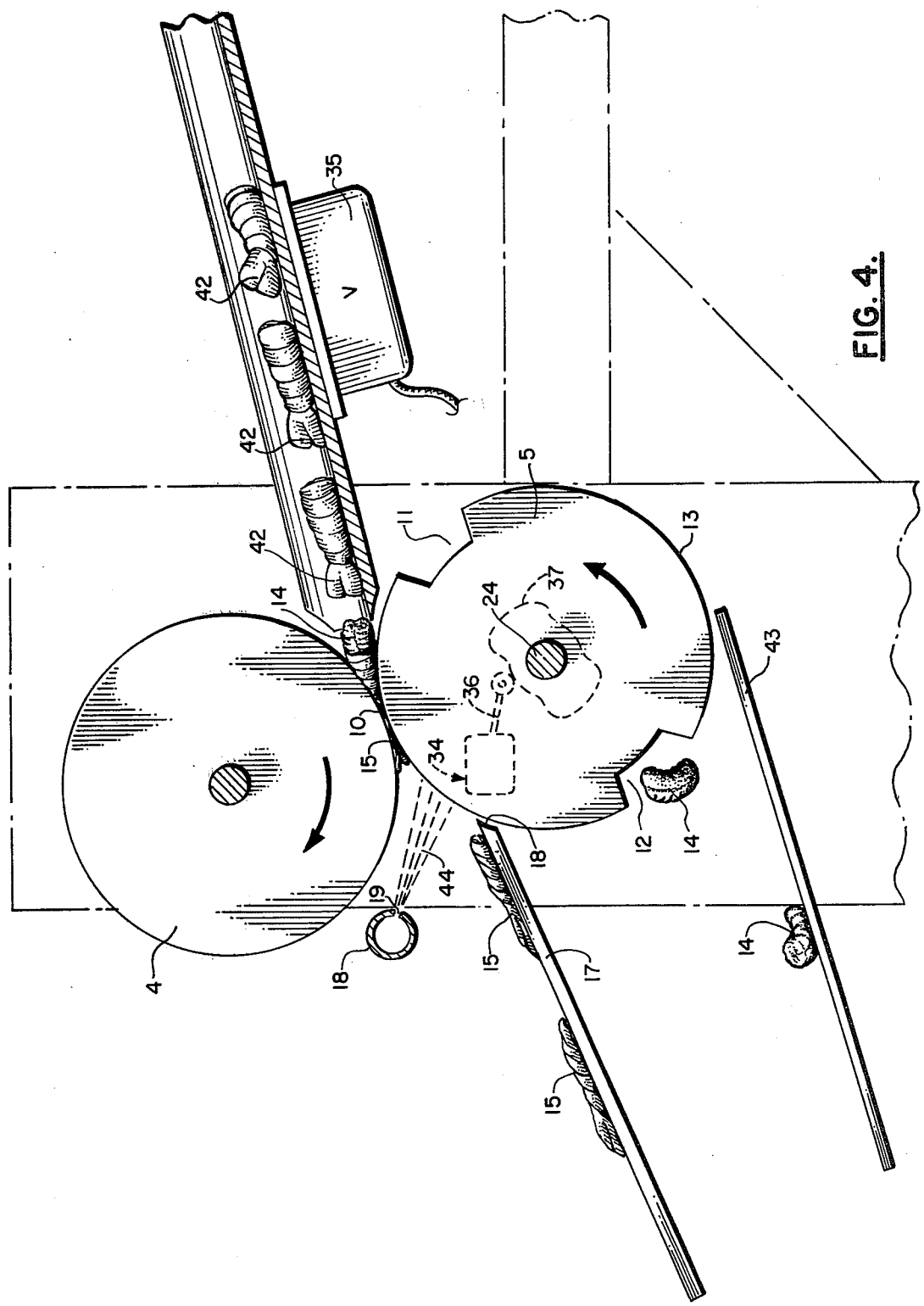
FIG. 4 is a side view of one embodiment of this invention illustrating how the apparatus works.

On side support plate 6 is attached a switch assembly 34 (see FIG. 3) which turns vibrator motor 35 on and off. Switching arm 36 is in contact with cam 37 attached to roller axle 24. In a preferred embodiment, cam 37 is positioned on axle 24 so that vibrator motor 35 is activated to deliver the crustacean to nip 10 just after groove 11 or 12 passes nip 10. The exact positioning of cam 37 will depend upon the type crustacean being processed, the amount of vibration on vibrator chute 38, the slope of chute 38 and other factors.

In still another preferred feature, particularly for the processing of crayfish, chute 38 comprises a series of parallel channels 39, each formed by sloping side walls 40, 41 that form a path for the crayfish to follow on vibrator 2.

Now by way of example, deheaded crayfish are placed on conveyor 3 with their tails 42 placed toward rollers 4, 5. Conveyor 3 delivers the crayfish to vibrator 2 where they are dropped in channels 39. As switch 36 is moved upward by cam 37, vibrator 2 slides the crayfish toward nip 10. After either groove 11 or 12 passes nip 10, the crayfish is vibrated onto roller 5 with its tail entering nip 10. The gripping action of rollers 4 and 5 force shell 15 between the rollers. As the shell 15 is forced between the rollers, meat 14 is squeezed out of shell 15 and into either groove 11 or 12. As roller 5 rotates, shell 15 is removed from roller 5 by the action of tray 17 and water stream 43. Shells 15 travel down tray 17 where they are collected and disposed of. Meat 14 continues in either groove 11 or 12 until it passes tray 17 where it then falls by gravity onto tray 44 for recovery.

If the meat extraction device is to be used on crabs, the crabs are first prepared for processing by the removal of their appendages, dorsal shell and innards. The remaining body is then broken in half and fed into nip 10.

There are, of course, many alternate embodiments, variations and changes not specifically disclosed but which are included in this invention as defined in the following claims.

What I claim is:

1. An apparatus for extraction of meat from a crustacean shell which comprises first and second rollers positioned adjacent one another to form a nip for receiving said crustacean shell, said first roller having at least one groove of sufficient size to hold said meat extracted from said crustacean shell when it passes through said nip, and a drive means attached to one of said rollers to cause said rollers to rotate in opposite directions.

2. An apparatus according to claim 1 wherein said first roller is positioned forward and adjacent to said second roller.

3. An apparatus according to claim 1 wherein there is more than one groove.

4. An apparatus according to claim 1 wherein a partitioning means is positioned behind said nip and adjacent said first roller.

5. An apparatus according to claim 4 wherein a washing assembly is positioned to direct a water or air stream on said partitioning means' top side to remove any crustacean shell from said rollers after said shell has passed through said nip.

6. An apparatus according to claim 1 wherein said groove is parallel with said nip.

7. An apparatus according to claim 1 wherein a conveyor assembly is forward said rollers and positioned to direct said crustaceans into said nip.

8. An apparatus for extraction of meat from a crayfish which comprises:
   (a) a rotatable top roller;
   (b) a rotatable bottom roller positioned adjacent and below said top roller to form a nip for receiving said crayfish tail first, said bottom roller having at least one groove at said bottom roller's outer surface, said groove being of sufficient size to hold said meat extracted from said crayfish;
   (c) A drive means connected to said bottom roller for rotating said bottom roller; and
   (d) a conveyor assembly forward said rollers and positioned to direct said crayfish tail first to said nip.

9. An apparatus according to claim 8 wherein said conveyor assembly comprising an angling means to turn said crayfish on or about its side before entering said nip.

* * * * *